US 8,593,416 B2

(12) United States Patent
Hsieh et al.

(10) Patent No.: US 8,593,416 B2
(45) Date of Patent: Nov. 26, 2013

(54) TOUCH DEVICE FOR INCREASING CONTROL EFFICIENCY AND DRIVING METHOD OF TOUCH PANEL THEREOF

(75) Inventors: Ming-Ta Hsieh, Taipei (TW);
Shian-Jun Chiou, Taipei (TW);
Hsueh-Fang Yin, Kaohsiung (TW);
Chien-Ming Lin, Kaohsiung (TW);
Huai-An Li, Taoyuan (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 711 days.

(21) Appl. No.: 12/754,619

(22) Filed: Apr. 6, 2010

(65) Prior Publication Data
US 2011/0181525 A1 Jul. 28, 2011

(30) Foreign Application Priority Data
Jan. 27, 2010 (TW) .............................. 99102301 A

(51) Int. Cl.
*G06F 3/041* (2006.01)
(52) U.S. Cl.
USPC ........................................................ 345/173
(58) Field of Classification Search
USPC ........................................................ 345/173
See application file for complete search history.

(56) References Cited

U.S. PATENT DOCUMENTS

| 5,956,020 A * | 9/1999 | D'Amico et al. | 345/173 |
| 5,982,302 A * | 11/1999 | Ure | 341/22 |
| 2002/0015024 A1 * | 2/2002 | Westerman et al. | 345/173 |
| 2006/0012581 A1 * | 1/2006 | Haim et al. | 345/173 |
| 2006/0279548 A1 * | 12/2006 | Geaghan | 345/173 |
| 2007/0152984 A1 * | 7/2007 | Ording et al. | 345/173 |
| 2007/0257891 A1 * | 11/2007 | Esenther et al. | 345/173 |
| 2008/0297482 A1 * | 12/2008 | Weiss | 345/173 |
| 2009/0066665 A1 * | 3/2009 | Lee | 345/173 |
| 2010/0309171 A1 * | 12/2010 | Hsieh et al. | 345/204 |

FOREIGN PATENT DOCUMENTS

| CN | 101615097 | 12/2009 |
| TW | I291642 | 12/2007 |

OTHER PUBLICATIONS

"First Office Action of China Counterpart Application", issued on Jun. 16, 2011, p. 1-5, in which the listed reference was cited.
"Office Action of Taiwan counterpart application" issued on May 31, 2013, p. 1-8, in which the listed reference was cited.

* cited by examiner

*Primary Examiner* — Chanh Nguyen
*Assistant Examiner* — Robert Stone
(74) *Attorney, Agent, or Firm* — Jianq Chyun IP Office

(57) ABSTRACT

A touch device includes a touch panel, a sensing unit, and an operation unit is provided. The sensing unit is coupled to the touch panel, for scanning a scan area of the touch panel to output a touch signal. The operation unit is coupled to the sensing unit, for determining the scan area according to the touch signal. When the touch signal corresponds to a first close path, the operation unit defines a close area formed by the first close path as the first sub touch area. When the first sub touch area is undefined, the operation unit chooses a whole touch area of the touch panel as the scan area. When the first sub touch area is defined, the operation chooses the first sub touch area as the scan area.

12 Claims, 4 Drawing Sheets

TOUCH DEVICE FOR INCREASING CONTROL EFFICIENCY AND DRIVING METHOD OF TOUCH PANEL THEREOF

CROSS-REFERENCE TO RELATED APPLICATION

This application claims the priority benefit of Taiwan application serial no. 99102301, filed on Jan. 27, 2010. The entirety of the above-mentioned patent application is hereby incorporated by reference herein and made a part of specification.

BACKGROUND

1. Technical Field

The present disclosure generally relates to a touch device, and more particularly to a touch device and a driving method of a touch panel thereof.

2. Related Art

With developing of technology, most electronic devices, such notebooks, cell phones, portable multimedia players, and so on, usually have touch panels as the new generation input interfaces to replace the traditional keyboards. The touch panels can be categorized into the resistive touch panels, the capacitive touch panels, the infrared light touch panels, and the supersonic touch panels, wherein resistive touch panels and the capacitive touch panels are most common products. In generally, when the touch panels operate, the touch panels scan the whole touch area thereof to sense the touch points.

For the projected capacitive touch panel, the larger the size of the panel is, the more the number of the sensors is, and the longer the time which the touch panel scans once is. In some condition, the user may not touch the whole touch area of the touch panel when the touch panel is used. Furthermore, assuming the touch panel is applied in the people interacting education system or the public system under the condition that the whole touch area of the touch panel is available, when user operates the touch panel, the user may be interfered by the operation of the other user, or may interfere the operation of the other user. To maintain the whole touch area of the touch area available not only decreases the efficiency, but also introduces interference.

SUMMARY

An exemplary embodiment of the preset disclosure provides a touch device. The touch device sets a small scan area according to the user requirement, such that the control efficiency of the touch device is increased, the power consumption is decreased, and the interference of the operation of the other user is avoided.

An exemplary embodiment of the preset disclosure provides a driving method in the touch panel. The driving method in the touch panel is capable of setting multiple scan areas for being respectively scanned, such that the interference of operations of users corresponding to the same touch panel is avoided.

An exemplary embodiment of the preset disclosure provides a touch device. The touch device comprises a touch panel, a sensing unit, and an operation unit, wherein the sensing unit is coupled to the touch panel, and the operation unit is coupled to the sensing unit. The sensing unit scans a scan area of the touch panel to output a touch signal. The operation unit determines the scan area according to the touch signal. When the touch signal corresponds to a first closed path, the operation unit defines a closed area formed by the first closed path as a first sub touch area. When the first sub touch area is undefined, the operation unit chooses a whole touch area of the touch panel as the scan area; when the first sub touch area is defined, the operation unit chooses the first sub touch area as the scan area and the coordinate of the first sub touch area is stored in the operation unit.

According to an exemplary embodiment of the present disclosure, the operation unit includes an interpolation unit and a sub touch area detector, wherein the sub touch area detector is coupled to the interpolation unit. The interpolation unit calculates positions of single-touch points, or positions of multi-touch points according to the touch signal. When the positions of the single touch points form the first closed path, the sub touch area detector defines the closed area formed by the first closed path as the first sub touch area. When the scan area is defined as the first sub touch area, the sub touch area detector changes the scan area to the whole touch area of the touch panel according to the positions of the touch points of the first sub touch area, or moves the first sub touch area according to a moving trajectory of the positions of the touch points.

According to an exemplary embodiment of the present disclosure, the operation unit further includes a coordinate register coupled between the interpolation unit and the sub touch area detector. The coordinate register stores the positions of the single-touch points, and the positions of the multi-touch points.

According to an exemplary embodiment of the present disclosure, the sensing unit includes a plurality of multiplexers, an analog-to-digital converter, and a counter, wherein the analog-to-digital converter is coupled to the multiplexers, and the counter is coupled to the analog-to-digital converter. The multiplexers scan the scan area of the touch panel, and sequentially output a plurality of analog signals. The analog-to-digital converter converts the analog signals to a plurality of digital signals. The counter quantizes the digital signal to output the touch signal.

According to an exemplary embodiment of the present disclosure, the touch panel is capacitive touch panel.

An exemplary embodiment of the present disclosure provides a driving method in the touch panel. Steps of the driving method are described as follows. A scan area of the touch panel is scanned to output a touch signal. The scan area is re-determined according to the touch signal. When the touch signal corresponds to a first closed path, a closed area formed by the first closed path is defined as a first sub touch area. When the first sub touch area is undefined, a whole touch area of the touch panel is chosen as the scan area. When the first sub touch area is defined, the first sub touch area is chosen as the scan area.

According to an exemplary embodiment of the present disclosure, the driving method in the touch panel further has the steps as follows. If the touch signal detected in the first sub touch area corresponds to N touch points when the scan area is the first sub touch area, the scan area is changed to the whole touch area of the touch panel, wherein N is a positive integer (for example N is 3). When a touching time corresponding to the N touch points mentioned above is less than a threshold time, the coordinate of the first sub touch area is stored. By contrast, when the touching time is larger than the threshold time, the coordinate of the first sub touch area is not stored.

According to an exemplary embodiment of the present disclosure, the driving method in the touch panel further has the steps as follows. If the touch signal detected in the first sub touch area corresponds to M touch points when the scan area is the first sub touch area, the first sub touch area is moved according to a moving trajectory of the M positions, wherein M is a positive integer (for example M is 5).

According to an exemplary embodiment of the present disclosure, step of moving the first sub touch area according to a moving trajectory of the positions of the touch points has the following steps. A central position of the touch points is calculated. The first sub touch area is moved according to a motion of the central position.

According to an exemplary embodiment of the present disclosure, the driving method in the touch panel further has the steps as follows. When the touch signal further corresponds to a second path, a closed area formed by the second closed path is defined as a second sub touch area. When the first and second sub touch areas are defined, the first and second sub touch areas are chosen as the scan area.

According to an exemplary embodiment of the present disclosure, when the touch signal corresponds to the first closed path, step of defining the closed area of the first closed path as the first sub touch area has the following steps. Positions of the single-touch points are calculated according to the touch signal. When the positions of the single-touch points form the first closed path, the closed area formed by the first sub closed path is chosen as the first sub touch area.

According to an exemplary embodiment of the present disclosure, the first sub touch area is a rectangular area or a circular area.

Accordingly, the touch device and the driving method in the touch panel provided by the exemplary embodiments of the present disclosure can locally scan the sub touch which defined as the closed area formed by the closed path, when the touch signal corresponds to the closed path, such that the sensing time of the touch panel is decreased, the control efficiency of the touch device is increased, and the power consumption is decreased. Furthermore, the sub touch areas can be set on the touch panel, and the touch states of the sub touch areas can be respectively scan, such that the interference of operations of users corresponding to the same touch panel is avoided.

It is to be understood that both the foregoing general description and the following detailed description are exemplary, and are intended to provide further explanation of the present disclosure as claimed.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
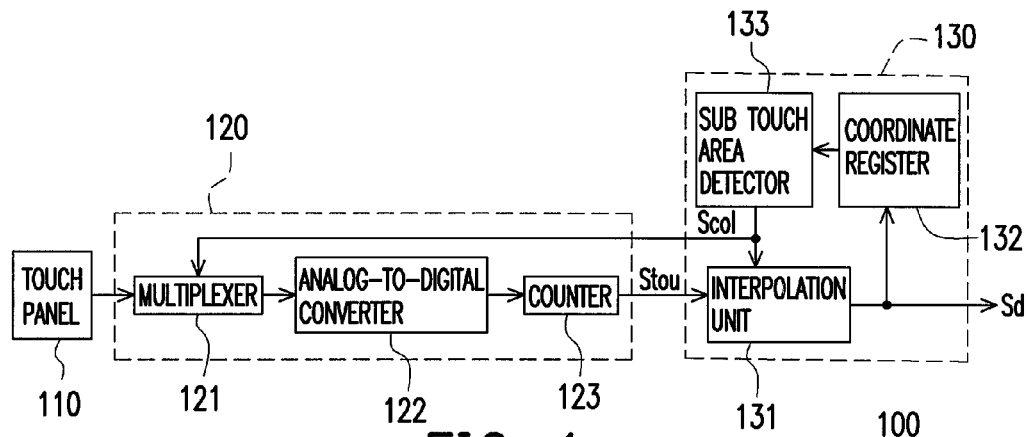
FIG. 1 is a system block diagram demonstrating a touch device provided by an exemplary embodiment of the present disclosure.

Reference will now be made in detail to the present exemplary embodiment of the present disclosure, examples of which are illustrated in the accompanying drawings. Wherever possible, the same reference numbers are used in the drawings and the description to refer to the same or like parts.

FIG. 1 is a system block diagram demonstrating a touch device provided by an exemplary embodiment of the present disclosure. Referring to FIG. 1, a touch device 100 includes a touch panel 110, a sensing unit 120, and an operation unit 130. The sensing unit 120 is coupled to the touch panel 110, and scans a scan area of the touch panel 110 according to the control signal Scol, so as to output the touch signal Stou. The operation unit 130 is coupled to the sensing unit 120. The operation unit 130 calculates positions of all of touch points according to the touch signal Stou, and determines the scan area according to the positions of all of touch points. Furthermore, the operation unit 130 outputs the touch data Sd (the touch data may include positions of the touch points and the control signal Scol) to the electronic device, and the electronic device operates according to the touch data, wherein the touch signal Stou is substantially identical to the positions of the touch points of the touch data Sd, but their data format are different.

In addition, before the operation unit 130 defines the sub touch area, the operation unit 130 chooses the whole touch area of the touch panel 110 as the scan area. After the operation unit 130 defines the sub touch area, the operation unit 130 chooses the sub touch area as the scan area. In other words, when the sub touch area is not defined by the operation unit 130, the sensing unit 120 scans the whole touch area of the touch panel 110. When the touch signal Stou corresponds to a closed path, the operation unit 130 defines the closed area formed by the closed path as the sub touch area, and the sensing unit 120 scans the sub touch area. Then, the control signal Scol is generated to the multiplexer 121 according to the coordinate of the sub touch area, so as to adjust the scan area. After the sub touch area is defined, the sensing unit 120 merely scans the sub touch area without scanning the whole touch area of the touch panel 110, so as to decrease the scanning time and power consumption for scanning.

After the sub touch area is defined, the user can use the multi-points touching control manner to cancel the definition of the sub touch area, or move the coordinate of the sub touch area. For example, the operation unit 130 determines to changes the scan area to the whole touch area of the touch panel 110, or to move the sub touch area, according to the number of the touch points corresponding to the touch signal Stou, and the operation unit 130 correspondingly generates the control signal Scol to scan the whole touch area of the touch panel 110 or the moved sub touch area. For example, when the touch signal Stou correspond to N touch points, the operation unit 130 changes the scan area to the whole touch area of the touch panel 110, and determines to store the coordinate of the sub touch area according to the touching time corresponding to the N touch points. That is, the definition of the sub touch area is cancelled, and the whole touch area of the touch panel 110 is scanned, wherein N is an integer, such as 3. When the touch signal Stou correspond to M touch points, the operation unit 130 moves the sub touch area according to the motion of positions of the M touch points, wherein M is an integer, such as 5, and M and N are different.

Accordingly, when the user wants to cancel the definition of the sub touch, the user can use his or her three fingers to touch the sub touch area, and then the operation unit 130 restores the scan area to the whole frame (i.e. the whole touch area of the touch panel 110), such that the user can operate, redefine the sub touch area, or define the other one sub touch area. When the user wants to move the sub touch area, the user can use his or her five fingers to touch the sub touch area, and move the fingers to move sub touch area, such that the scan area is changed. It is noted that the values of M and N are merely one exemplary embodiment of the present disclosure, and they can be set to be the other values. In other words, the values of M and N are not used to limit the present disclosure. In addition, the operation unit 130 can be a micro controller, for recording the program of the actions above by using the firm ware, such that the operation unit 130 can carry out the actions above.

The sensing unit 120 includes a multiplexer 121, an analog-to-digital converter 122, and a counter 123. The multiplexer 121 scan the scan area of the touch panel 110 according to the control signal Scol, and sequentially outputs analog signals correspondingly. The analog-to-digital converter 122 is coupled to multiplexer 121, for converting the analog signals to digital signals. The counter 123 is coupled to the analog-to-digital converter 122, and used to quantize the digital signal to the touch signal Stou. It is noted that, the type and the number of the multiplexer may vary according to the type and the touch manner of the touch panel, and thus the number of the multiplexer may not be one in the other exemplary embodiment.

The operation unit 130 includes an interpolation unit 131, a coordinate register 132, and a sub touch area detector 133. The interpolation unit 131 calculates positions of the single-touch point or positions of the multi-touch points according to the control signal Scol and the touch signal Stou, and outputs the touch data Sd correspondingly. The coordinate register 132 stores the positions of the single-touch point or positions of the multi-touch points. The sub touch area detector 133 determines whether the state of the touch panel 11 is the single-touching state or the multi-touching state according to the positions of the touch point(s) stored in the coordinate register 132. In other words, once the touch panel is scanned, and once the coordinate register 132 stores positions of the touch points, meaning that the touch panel 110 operates in the multi-touching state. On the contrary, once the touch panel is scanned, and once the coordinate register 132 stores positions of the single-touch points, meaning that the touch panel 110 operates in the single-touching state.

When touch panel 110 operates in the single-touch state, the sub touch area detector 133 determines whether the positions of the single-touch points stored in the coordinate register 132 form a continuously moving trajectory. In other words, the sub touch detector 133 determines whether the user's finger slides on the touch panel according to whether the positions of the single-touch points stored in the coordinate register 132 form the continuously moving trajectory. When the continuously moving trajectory form a closed path (i.e. the first closed path 10), the sub touch area detector 133 defines a closed area formed by the first closed path as a sub touch area (i.e. the first sub touch area 11), and the control signal Scol is thus generated to define the first sub touch area as the scan area. Accordingly, the touch device 100 merely scans the scan area, wherein the touchable area is limited in the scan area, and the other area is the non-touchable area.

If the user performs a multi-touching process on the first sub touch area after the first sub touch area 11 is defined, the user can set the first sub touch area 11 according to the number of the touch points and the operation of the touch points. In other words, when the number of the touch point is N (for example N is 3), the sub touch area detector 133 generates the control signal Scol to defines the whole touch area of the touch panel as the scan area. When the touching time is less than the threshold time, the sub touch area detector 133 stores the control signal Scol corresponding to the first sub touch area (i.e. the coordinate of the first sub touch area is equivalently stored); when the touching time is larger than the threshold time, the sub touch area detector 133 does not store the control signal Scol corresponding to the first sub touch area. When the number of the touch points is M (for example M is 5), the first sub touch area is moved according to the moving vector of the positions of the touch points, and thus the control signal Scol is generated to define the moved first sub touch area as the scan area.

In addition, after the whole touch area of the touch panel 110 is defined as the scan area, the control signal Scol corresponding to the first touch area mentioned above is stored in the sub touch area detector 133. Next, when the user's fingers form another moving trajectory, and the moving trajectory on the touch panel 110 form another closed path (i.e. the second closed path), the sub touch area detector 133 defines a closed area formed by the second closed path as the second sub touch area, and the control signal Scol is generated to define the first and second sub touch areas as the scan area (p.s. there are no reference numbers corresponding to the closed paths and the touch areas in FIG. 1).

Figure 2:
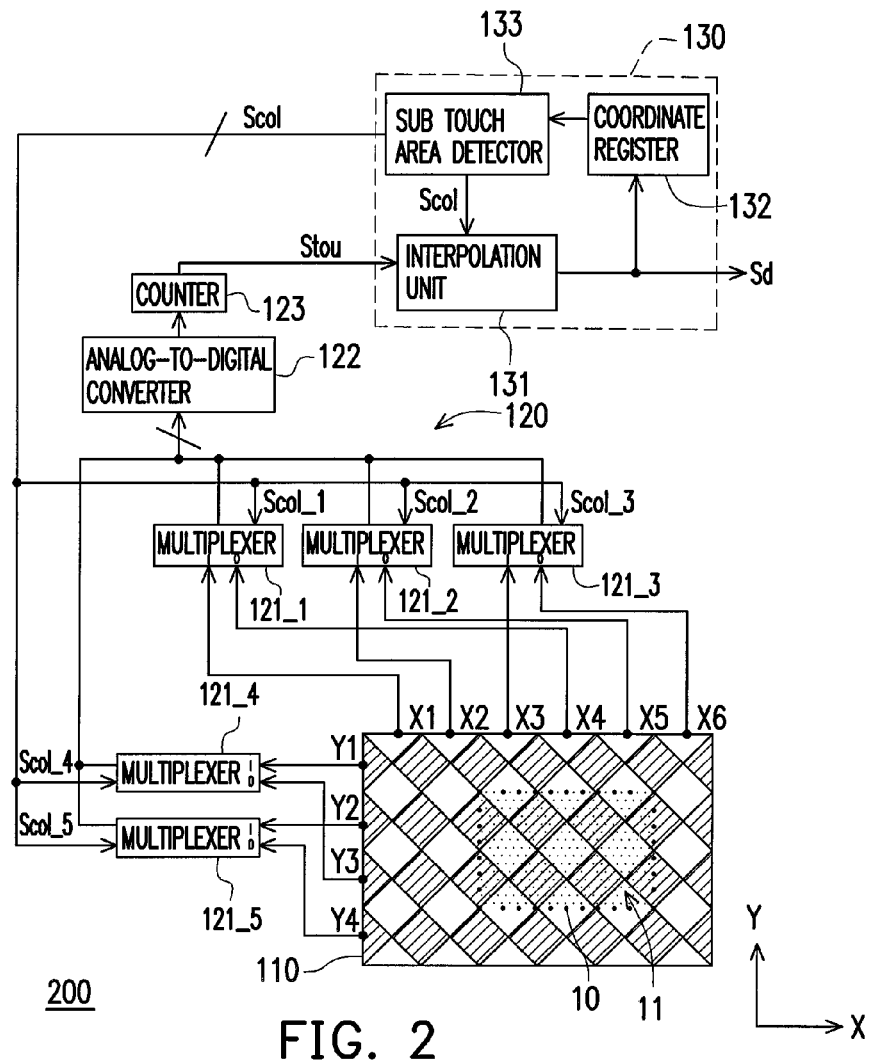
FIG. 2 is a circuit diagram demonstrating a touch device provided by an exemplary embodiment of the present disclosure.

FIG. 2 is a circuit diagram demonstrating a touch device provided by an exemplary embodiment of the present disclosure. Referring to both of FIG. 1 and FIG. 2, in the exemplary embodiment of the present disclosure, the touch device 200 includes multiple multiplexers (such as 121_1-121_5), the touch panel 110 is the capacitive touch panel with the capacitors on the crossing axes, and the other elements can be understood by referring the description of FIG. 1. Furthermore, the control signal Scol transmitted to the multiplexers 121_1-121_5 is substantially identical to the control signal Scol transmitted to the interpolation unit 131, but they are different in fashion (for example parallel or serial fashion), wherein the control signal Scol transmitted to the multiplexers 121_1-121_5 can be divided to the control signals Scol_1-Scol_5 to control the multiplexers 121_1-121_5.

Figure 3:
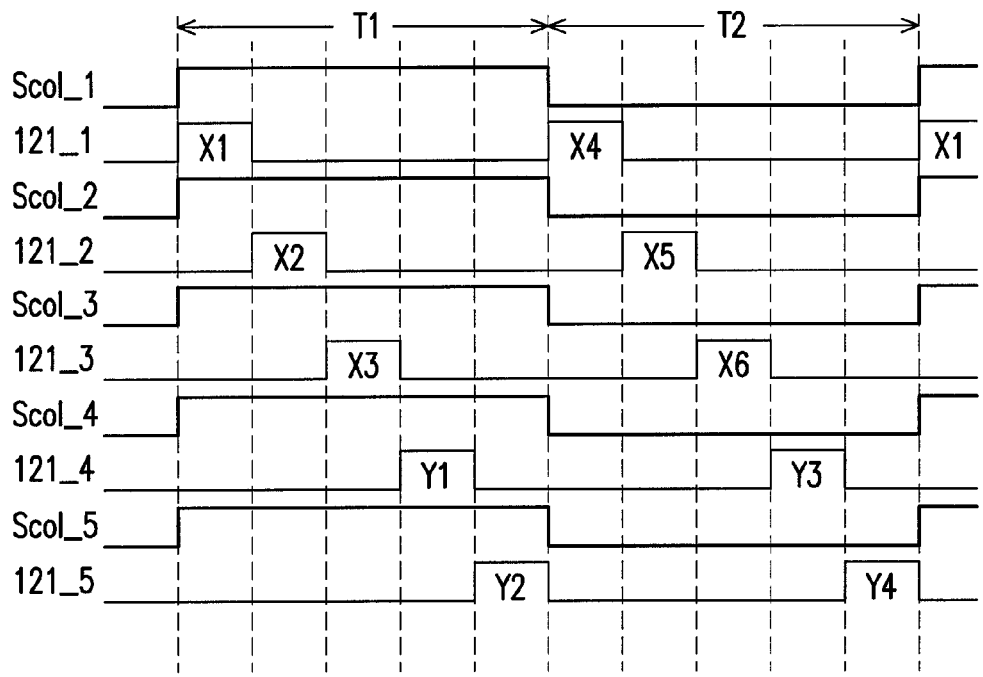
FIG. 3 is an oscillogram of the control signal and the outputs of the multiplexers of the touch device shown in FIG. 2.

FIG. 3 is an oscillogram of the control signal and the outputs of the multiplexers of the touch device shown in FIG. 2. Before the sub touch area is defined, the sub touch area detector 133 chooses the whole touch area of the touch panel 110 as the scan area. The whole channels (i.e. X1-X6 and Y1-Y4) of the touch panel 110 must be scanned, and the sensing signal of the touch panel 110 is therefore obtained. Referring to FIG. 3, during the operation period T1, the control signals Scol_1-Scol_5 are high, so as to control the multiplexers 121_1-121_5 to scan the channels X1-X3 and Y1-Y2, and to sequentially output the sensing signals to the analog-to-digital converter 122. Next, during the operation period T2, the control signals Scol_1-Scol_5 are low so as to control the multiplexers 121_1-121_5 to scan the channels X4-X6 and Y3-Y4, and to sequentially output the sensing signals to the analog-to-digital converter 122. After the operation periods T1 and T2, the touch device 200 obtains the sensing signals from the channels X1~X6 and Y1~Y4, and the whole panel 110 is therefore scanned.

On the other hand, when the motion of the user's fingers form the first closed path (shown as the dotted line 10 in FIG.

2), the sub touch area detector 133 defines the closed area formed by the first closed path 10 as the first sub touch area 11. Taking the first sub touch area 11 as an example, the touch device 200 merely has to obtain the sensing signals from the channels X3~X5 and Y2~Y3 to detect the touch state of the first sub touch area 11.

Figure 4:
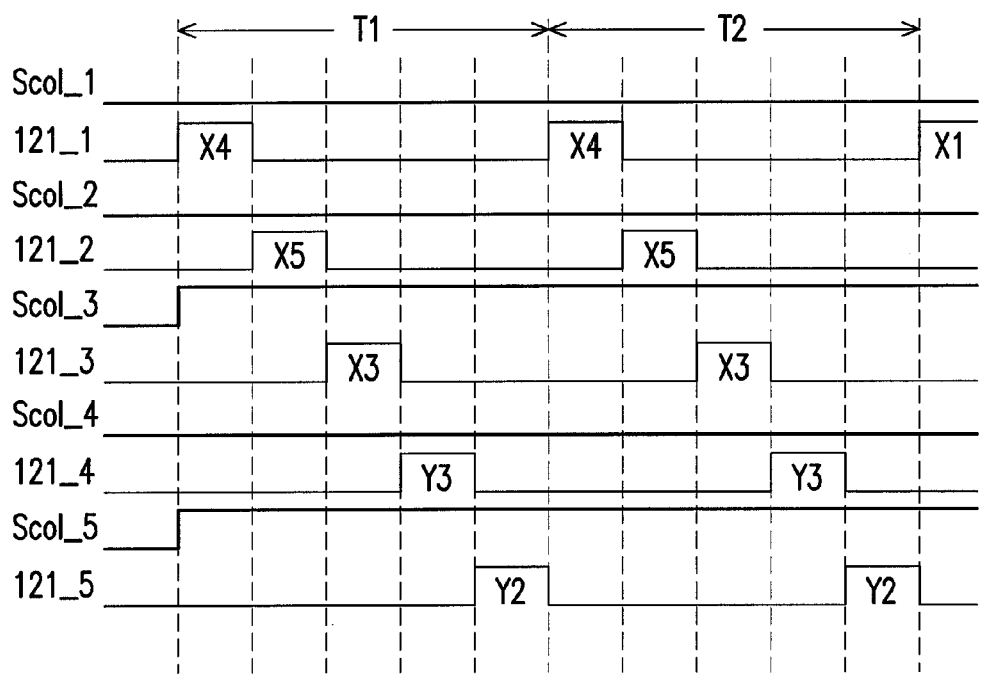
FIG. 4 is another oscillogram of the control signal and the outputs of the multiplexers of the touch device in FIG. 2.

FIG. 4 is another oscillogram of the control signal and the outputs of the multiplexers of the touch device in FIG. 2. Referring to FIG. 4, after the first sub touch area 11 is defined, the touch device 200 merely sensing the first sub touch area 11, the control signals Scol_3 and Scol_5 are set to be high, and the control signals Scol_1, Scol_2, and Scol_4 are set to be low. At the same time, the multiplexers 121_1-121_5 obtain the sensing signals from the channels X4, X5, X3, Y3, and Y2, and sequentially output the sensing signals to the analog-to-digital converter 122. Accordingly, after the first sub touch area 11 is defined, the touch device 200 only needs one operation period (such as T1 or T2) to complete the sensing operation of the touch panel 110. Thus the control efficiency of the touch device 200 is increased, and the power consumption is decreased.

Figure 5A:
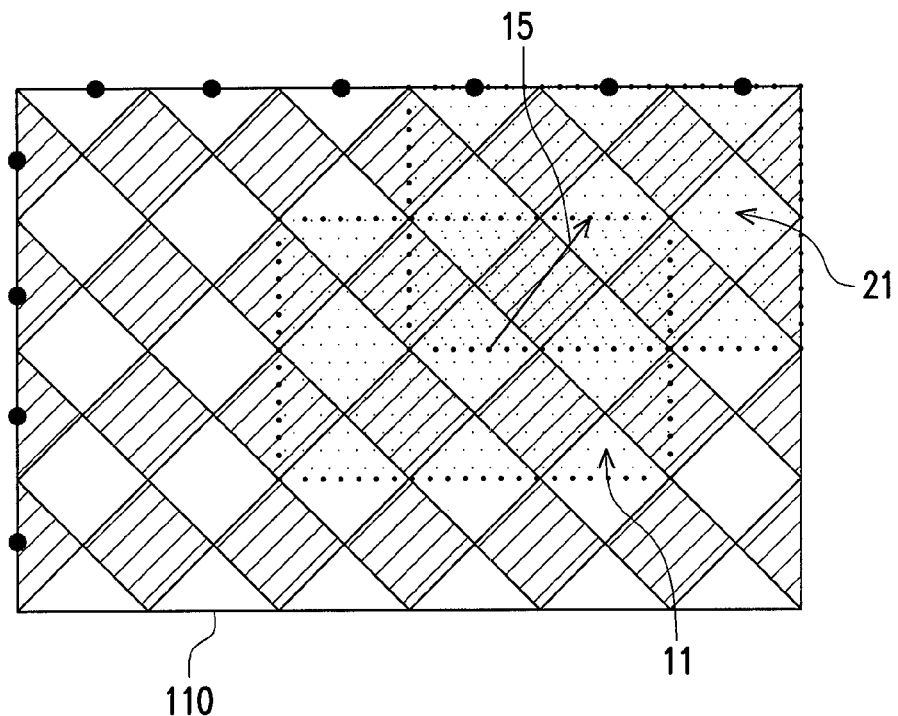
FIG. 5A is a schematic diagram demonstrating the motion of the sub touch area of the touch panel in FIG. 2.

FIG. 5A is a schematic diagram demonstrating the motion of the sub touch area of the touch panel in FIG. 2. Referring to FIG. 5A, when the user wants to move the first sub touch area 11, he or she may use five fingers thereof to touch the first sub touch area 11 of the touch panel 110 to perform a 5-touch points operation, and move the 5 touch points. At the same time, the sub touch area detector 133 detects the central position of the 5 touch points, and move the first sub touch area 11 according to the moving direction and the moving vector of the central position. Accordingly, when the users' 5 fingers move along with the direction of the arrow 15, the first sub touch area 11 will be moved to the position of the first sub touch area 21, as the new scan area, assuming the starting and ending points of the arrow 15 are respectively the central position and the moved central position of the 5 touch points. If the user wants to temporarily cancel the first sub touch area 21, the user can use three fingers to touch the first sub touch area 21 to perform a 3-touch points operation, and the touching time must be less than the threshold time. If the user wants to permanently cancel the first sub touch area 21, the user can use three fingers to touch the first sub touch area 21 to perform a 3-touch points operation, and the touching time must be larger than or equal to the threshold time.

Figure 5B:
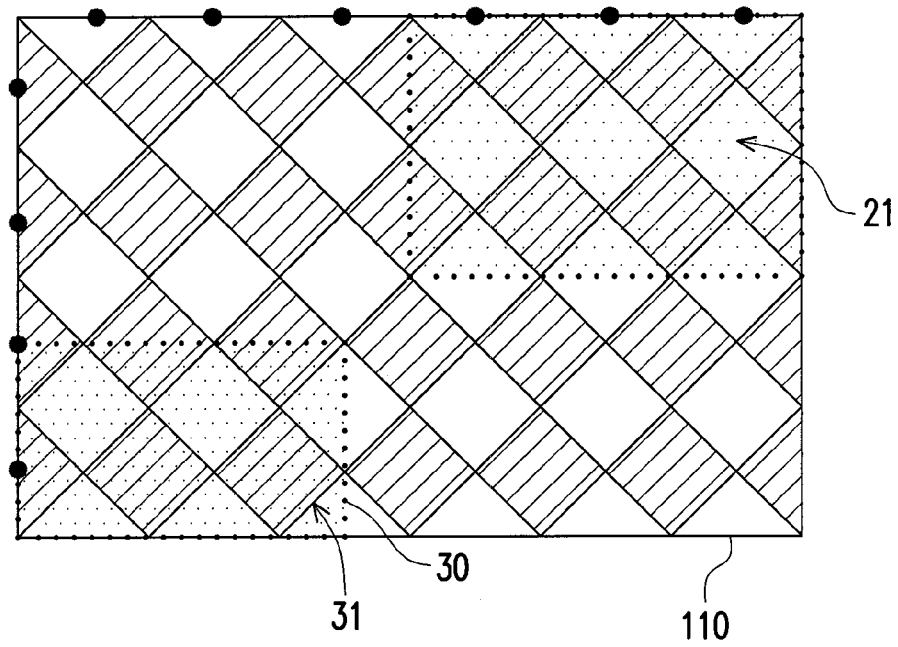
FIG. 5B is a schematic diagram demonstrating the sub touch areas of the touch panel in FIG. 2.

FIG. 5B is a schematic diagram demonstrating the sub touch areas of the touch panel in FIG. 2. Referring to FIG. 5B, when the user temporarily cancel the first sub touch area 21, the sub touch area detector 133 stores the control signals Scol_1-Scol_5 corresponding to the first sub touch area 21, and generates the control signals Scol_1-Scol_5 as shown in FIG. 3 to scan the whole touch panel. Next, when the user uses the fingers to form the second closed area (shown as the dotted line 30), the sub touch area detector 133 defines the closed area formed by the second closed path 30 as the second sub touch area 31. The sub touch area detector 133 respectively generates the control signals Scol_1-Scol_5 corresponding to the first sub touch areas 21 and the second sub touch area 31, so as to scan the first sub touch areas 21 and the second sub touch area 31, wherein the control signals Scol_1-Scol_5 corresponding to the first sub touch areas 21 and the second sub touch area 31 are outputted in the different operation periods, such that the first sub touch areas 21 and the second sub touch area 31 are scanned in the different operation period. Therefore, the touch device 200 can respectively sensing the first sub touch areas 21 and the second sub touch area 31, such that the interference of the operations of the users is avoided.

It is noted that, description related to the number of the touch points and the drawings of the touch panel is merely one exemplary embodiment of the present disclosure, and people skilled in the art may modify the touch device according to the variation of the circuit design to achieve the operation for defining the sub touch area. The shape of the sub touch area may be a rectangular, a circular, or an irregular shape. The number of the sub touch areas may be set initially, and the sub touch areas may be scanned after the sub touch areas are defined. In addition, the touch device provided by the exemplar embodiment of the present disclosure can be modified to be applied in the multi-touch device, such that the control efficiency is increased, the power consumption is decreased, and the interference of the users is avoided. Moreover, the sub touch area is defined via the user interface, and the user interface provides a menu to the user, such that the user can determines whether the function for defining the personal touch area as the sub touch areas should be enabled or disabled. If the function is disabled, the touch panel can scan the whole frame in the normal scan mode. In other words, the touch panel can be the general purpose touch panel.

Figure 6:
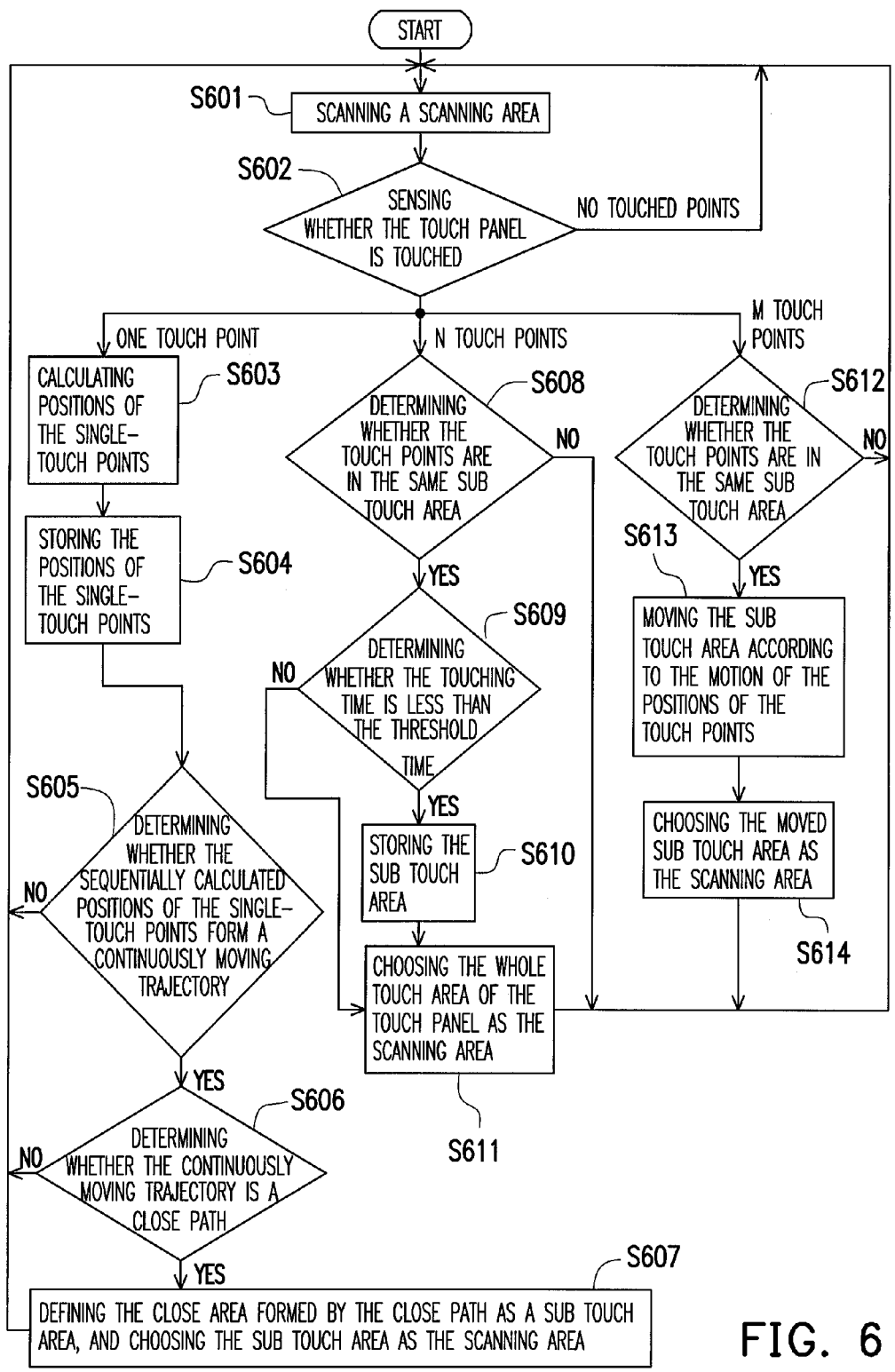
FIG. 6 is a flow chart demonstrating a driving method used in the touch panel provided by an exemplary embodiment of the present disclosure.

According to the exemplary embodiment, a driving method in the touch panel is deduced. The driving method is adapted in the touch devices 100 or 200. FIG. 6 is a flow chart demonstrating a driving method used in the touch panel provided by an exemplary embodiment of the present disclosure. Referring to FIG. 6, first, the scan area of the touch panel is scanned (step S601), wherein the scan area is the whole touch area of the touch panel before the sub touch area is defined. Next, the touch panel is sensed to determine whether the touch panel is touch (step S602). If the touch panel is not touch, the method goes back to the step S601, and the touch panel is scanned again.

When the touch panel is touched by the single-touch points, positions of the single-touch points are calculated according to the touch signal (step S603), and the positions of the single-touch points is stored (step S604). Next, whether the positions of the single-touch points sequentially calculated form a continuously moving trajectory is determined (step S605). When the positions of the single-touch points sequentially calculated form a continuously moving trajectory, whether the continuously moving trajectory form a closed path is determined (step S606). When the continuously moving trajectory forms a closed path, the closed area formed by the closed path is defined as the sub touch area, and the sub touch area is chosen as the scan area (step S607). When the determined results of steps S605 and S606 are false, the driving method goes back to steps S601 to scan the touch panel again. Therefore, the scan area can be set according to the touch signal. That is, when the touch signal corresponds to the closed path, the area formed by the closed area is defined as the sub touch area.

When the touch panel is touch by the N touch points (for example, the touch signal corresponds to 3 touch points), whether the 3 touch points are in the same sub touch area is determined (step S608). When the 3 touch points are in the same sub touch area, and the touching time is less than the threshold time (step S609), all of the sub touch areas of the touch panel are stored (step S610), and the whole touch area of the touch panel is chosen as the scan area (step S611). Next, the driving method goes back to steps S601, and the touch panel is scanned again. When the three touch points are in the same sub touch area, and the touching time is larger than or equal to the threshold time (step S609), all of the sub touch areas of the touch panel are not stored, and the whole touch area of the touch panel is chosen as the scan area (step S611). Next, the driving method goes back to steps S601, and the touch panel is scanned again.

Before the sub touch area is defined, step S608 can not determine whether the 3 touch points are in the same sub touch area, thus the determined result is false, and steps S609 through S611 are executed after the sub touch area is defined. Thus when the determined result of step S608 is false, the driving method goes back to the step S601, and the touch panel is scanned again. Accordingly, after the sub touch area is defined, and the touch signal indicates that the 3 touch points are in the same sub touch area, whether the coordinate of the sub touch area is stored according to the touching time, and next, the whole touch area of the touch panel is chosen as the scan area.

When the touch panel is touch by M touch points (for example the touch signal corresponds to 5 touch points), whether the 5 touch points are in the same sub touch area is determined (step S612). When the 5 touch points are in the same the same sub touch area, the sub touch area is moved according to the motion of the positions of the touch points (steps S613), and the moved sub touch area is chosen as the scan area (steps S614). Next, the driving method goes back to the step S601, and the touch panel is scanned again. Referring to the description of step S608, only after the sub touch area is defined, steps 613 and 614 following step S612 are executed. When the determined result of step S612 is false, the driving method goes back to the step S601. Accordingly, after the sub touch area is defined, and the touch signal indicates that the 5 touch points are in the same sub touch area, the sub touch area is moved according to the motion of the positions of the touch points. It is noted that the details of steps are described in the description related to the touch devices 100 and 200, thus not stating again.

Accordingly, the driving method in the touch panel and the touch device provided by exemplary embodiments of the present disclosure can define the closed area formed by the motion which the user's fingers slide on the touch panel as the sub touch area, so as to decrease the sensing time of the touch panel, and increase the control efficiency of the touch device. Furthermore, the sub touch areas can be defined on the touch panel, and the sub touch areas can be respectively scanned to determine their touch state, such that the interference of operations of the users is avoided.

It will be apparent to those skilled in the art that various modifications and variations can be made to the structure of the present disclosure without departing from the scope or spirit of the present disclosure. In view of the foregoing descriptions; it is intended that the present disclosure covers modifications and variations of this present disclosure if they fall within the scope of the following claims and their equivalents.

What is claimed is:

1. A touch device, comprising:
   a touch panel;
   a sensing unit, coupled to the touch panel, for scanning a scan area of the touch panel to output a touch signal; and
   an operation unit, coupled to the sensing unit, for determining the scan area according to the touch signal, when the touch signal corresponds to a first closed path, the operation unit defines a closed area formed by the first closed path as a first sub touch area;
   wherein when the first sub touch area is undefined, the operation unit chooses a whole touch area of the touch panel as the scan area; when the first sub touch area is defined, the operation unit chooses the first sub touch area as the scan area, and a coordinate of the first sub touch area is stored in the operation unit,
   wherein the operation unit comprises:
      an interpolation unit, for calculating positions of a plurality of single-touch points according to the touch signal; and
      a sub touch area detector, coupled to the interpolation unit, wherein when the positions of the single-touch points form the first closed path, the sub touch area detector defines the closed area formed by the first closed path as the first sub touch area,
      wherein the interpolation unit further calculates positions of multi-touch points according to the touch signal, and when the scan area chosen by the sub touch area detector is the first sub touch area, the scan area is changed to the whole touch area of the touch panel according to the positions of the multi-touch points corresponding to the first sub touch area, or the first sub touch area is moved according to a moving trajectory of the positions of multi-touch points.

2. The touch device according to claim 1, wherein the operation unit further comprises:
   a coordinate register, coupled to the interpolation unit and the sub touch area detector, for storing the positions of the single-touch points, and the positions of the multi-touch points.

3. The touch device according to claim 1, wherein the sensing unit comprises:
   a plurality of multiplexers, for scanning the scan area of the touch panel, and sequentially outputting a plurality of analog signals;
   an analog-to-digital converter, coupled to the multiplexers, for converting the analog signals to a plurality of digital signals; and
   a counter, coupled to the analog-to-digital converter, for quantizing the digital signal to output the touch signal.

4. The touch device according to claim 1, wherein the touch panel is a capacitive touch panel.

5. A driving method in a touch panel, comprising:
   scanning a scan area of the touch panel to output a touch signal;
   re-determining the scan area according to the touch signal, when the touch signal corresponds to a first closed path, defining a closed area formed by the first closed path as a first sub touch area;
   wherein when the first sub touch area is undefined, choosing a whole touch area of the touch panel as the scan area; when the first sub touch area is defined, choosing the first sub touch area as the scan area;
   if the touch signal detected in the first sub touch area corresponds to N touch points when the scan area is the first sub touch area, changing the scan area to the whole touch area of the touch panel, wherein N is a positive integer;
   when a touching time corresponding to the N touch points is less than a threshold time, a coordinate of the first sub touch area is stored; and
   when a touching time corresponding to the N touch points is greater than or equal to a threshold time, a coordinate of the first sub touch area is not stored.

6. The driving method in the touch panel according to claim 5, wherein N is 3.

7. The driving method in the touch panel according to claim 5, further comprising:
   if the touch signal detected in the first sub touch area corresponds to M touch points when the scan area is the first sub touch area, moving the first sub touch area according to a moving trajectory of positions of the M touch points, wherein M is a positive integer.

8. The driving method in the touch panel according to claim 7, wherein M is 5.

9. The driving method in the touch panel according to claim 7, wherein step of moving the first sub touch area according to a moving trajectory of the positions of the touch points comprises:
   calculating a central position of the touch points; and
   moving the first sub touch area according to a motion of the central position.

10. The driving method in the touch panel according to claim 5, further comprising:
    when the touch signal further corresponds to a second path, defining a closed area formed by the second closed path as a second sub touch area; and
    when the first and second sub touch areas are defined, choosing the first and second sub touch areas as the scan area.

11. The driving method in the touch panel according to claim 5, wherein when the touch signal corresponds to the first closed path, step of defining the closed area of the first closed path as the first sub touch area comprises:
    calculating positions of a plurality of the single-touch points according to the touch signal; and
    when the positions of the single-touch points form the first closed path, choosing the closed area formed by the first sub closed path as the first sub touch area.

12. The driving method in the touch panel according to claim 5, wherein the first sub touch area is a rectangular area or a circular area.

* * * * *